United States Patent

Heeks et al.

[11] Patent Number: 5,864,740
[45] Date of Patent: Jan. 26, 1999

[54] THERMALLY STABILIZED SILICONE LIQUID AND A FUSING SYSTEM USING THE THERMALLY STABILIZED SILICONE LIQUID

[75] Inventors: George J. Heeks, Rochester; Santokh S. Badesha, Pittsford; Clifford O. Eddy, Webster; Arnold W. Henry, Pittsford; David J. Gervasi, Rochester, all of N.Y.

[73] Assignee: Xerox Corporation, Stamford, Conn.

[21] Appl. No.: 841,986

[22] Filed: Apr. 8, 1997

[51] Int. Cl.⁶ .......................... G03G 15/20; G03G 21/00
[52] U.S. Cl. ............................................................ 399/325
[58] Field of Search ........................... 399/324, 325, 399/328, 333; 528/15

[56] References Cited

U.S. PATENT DOCUMENTS

| 4,146,659 | 3/1979 | Swift et al. | 427/194 |
| 4,347,346 | 8/1982 | Eckberg | 528/15 |
| 5,157,445 | 10/1992 | Shoji et al. | 355/284 |
| 5,493,376 | 2/1996 | Heeks | 355/284 |

FOREIGN PATENT DOCUMENTS

| 62-252457 | 11/1987 | Japan . |
| 62-256863 | 11/1987 | Japan . |
| 5-295263 | 11/1993 | Japan . |

OTHER PUBLICATIONS

W.P. Griffith, *The Chemistry of the Rarer Platinum Metals (Os, Ru, Ir and Rh)*, Interscience Publishers, pp. 141–142 (1967).

*Rubber Technology*, edited by Maurice Morton, Van Nostrand Reinhold Company, pp. 407–408 (3rd Edition).

*Primary Examiner*—Fred L. Braun
*Attorney, Agent, or Firm*—Zosan S. Soong

[57] ABSTRACT

A thermally stabilized silicone liquid composition and a toner fusing system using the thermally stabilized silicone liquid composition as a release agent are described, wherein the thermally stabilized silicone liquid composition is composed of a silicone liquid and a thermal stabilizer composition including a reaction product from at least a polyorganosiloxane and a platinum metal compound such as a ruthenium compound, excluding platinum.

16 Claims, 2 Drawing Sheets

THERMALLY STABILIZED SILICONE LIQUID AND A FUSING SYSTEM USING THE THERMALLY STABILIZED SILICONE LIQUID

FIELD OF THE INVENTION

This present invention relates to a thermally stabilized silicone liquid and in particular to a fusing system for fusing toner images in an electrostatographic printing apparatus which employs the silicone liquid as a release agent.

BACKGROUND OF THE INVENTION

In a typical electrostatographic reproducing apparatus, a light image of an original to be copied is recorded in the form of an electrostatic latent image upon a photosensitive member and the latent image is subsequently rendered visible by the application of toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, toner particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or otherwise degrading the resulting output. The so called "hot offset" occurs when the temperature of the toner is raised to a point where the toner particles liquefy and a splitting of the molten toner takes place during the fusing operation with a portion remaining on the fuser member. The hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser members to ensure that the toner is completely released from the fuser roll during the fusing operation. Typically, these materials are applied as thin films of, for example, silicone oils to prevent toner offset.

The silicone oils employed as release agents in these practices are typically polyorganosiloxanes, more specifically, polydimethylsiloxanes, which are used in a range of viscosities of from about 100 centistokes to 13,000 centistokes. While capable of performing satisfactorily these silicone oil release agents suffer from certain deficiencies. In particular, they tend to show an increase in viscosity with eventual gelling when held at elevated temperatures with the consequence that the release agent management delivery system can be adversely affected. For example, the release agent oil can gel while on the fuser roll or in the supply lines of the release agent management system. As previously discussed the typical fusing systems in electrostatographic printing apparatus have a heated fuser roll heated to temperatures of the order of 90° to 160° C. and sometimes to temperatures approaching 200° C. An additional problem associated with these silicone oils at elevated temperatures is the generation of silicone oil vapor which is a detrimental byproduct in that it tends to form insulating layers on the electrical circuits and contacts and may therefore interfere with the proper functioning of these circuits and contacts. Furthermore, depending on the chemical makeup of the silicone oils the vapors released at elevated temperatures may include environmentally undesirable materials such as benzene, formaldehyde, trifluoropropionaldehyde. Thus, there is a need, which the present invention addresses, for new thermal stabilizer compositions for functional and non-functional silicone liquids.

The following information may be pertinent:

Materials used in conventional fusing systems are disclosed in Heeks, U.S. Pat. No. 5,493,376, Shoji et al., U.S. Pat. No. 5,157,445, and Swift et al., U.S. Pat. No. 4,146,659.

The chemistry of the platinum metals is discussed in W. P. Griffith, *The Chemistry of the RARER PLATINUM METALS (Os, Ru, Ir and Rh)*, Interscience Publishers, pp. 141–142 (1967); and *RUBBER TECHNOLOGY*, edited by Maurice Morton, Van Nostrand Reinhold Company, pp. 407–408 (3rd Edition).

The phrase platinum metal used herein is defined in *Hawley's Condensed Chemical Dictionary*, Van Nostrand Reinhold Company, p. 927 (11th Edition) as follows: "Any of a group of six metals, all members of group VIII of the periodic system: ruthenium, rhodium, palladium, osmium, iridium, and platinum. All of these are also transition metals."

SUMMARY OF THE INVENTION

The present invention is accomplished in embodiments by providing a thermally stabilized silicone liquid composition comprising:

(a) a silicone liquid; and (b) a thermal stabilizer composition including a reaction product from at least a ruthenium compound and a polyorganosiloxane.

In embodiments of the present invention, there is also provided a fusing system for an electrostatographic printing machine comprising:

(a) a heated fuser member;

(b) a pressure member forming a fusing nip with the fuser member;

(c) a supply of release agent; and (d) a release agent delivery apparatus to deliver the release agent to the surface of the fuser member, wherein the release agent comprises a silicone liquid and a thermal stabilizer composition including a reaction product from at least a ruthenium compound and a polyorganosiloxane.

In embodiments of the present invention, there is provided a thermally stabilized silicone liquid composition comprising:

(a) a silicone liquid; and (b) a thermal stabilizer composition including a reaction product from at least a polyorganosiloxane and a platinum metal compound excluding platinum, where the platinum metal compound is selected from the group consisting of a ruthenium compound, a rhodium compound, a palladium compound, an osmium compound, and an iridium compound.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

In the toner fusing area, the conventional silicone liquids used as release agents are commonly referred to as silicone oils. Thus, the silicone liquid may be referred herein as an oil. However, the term oil is not intended to limit the type of silicone liquid that can be thermally stabilized according to the present invention.

Figure 1:
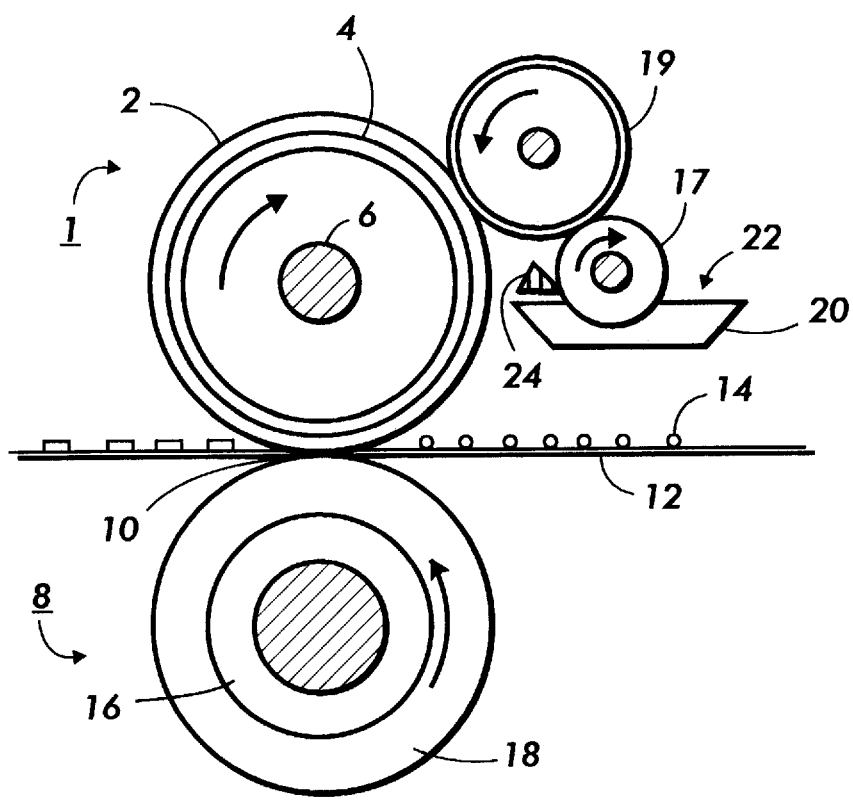
FIG. 1 is a schematic representation in cross-section of a fusing system of an electrostatographic printing machine which employs the thermally stabilized silicone liquid composition of the present invention.

A typical fusing system of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner image 14 thereon contact elastomer surface 2 of fuser roll 1. As shown in FIG. 1, the backup roll 8 has a rigid steel core 16 with a soft surface layer 18 thereon. Sump 20 contains polymeric release agent 22 which may be a solid or liquid at room temperature, but is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent from the sump 20 to the elastomer surface 2. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to the elastomer surface 2 in controlled thickness ranging from submicrometer thickness to a thickness of several micrometers of release fluid. Thus, by metering device 24 about 0.1 to 2 micrometers or greater thickness of release fluid can be applied to the elastomer surface 2.

As used herein, the phrase fuser system component may be a roll belt, flat surface or other suitable shape used in the fixing of thermoplastic toner images to a suitable substrate. It may take the form of a fuser member, a pressure member or a release agent donor member preferably in the form of a cylindrical roll. Typically, the fuser system component is made of a hollow cylindrical metal core, such as copper, aluminum, steel and like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, silicone grafted fluoroelastomers, EPDM and Teflon PFA sleeved rollers. EPDM is ethylene propylene diene terpolymer and PFA is a Teflon copolymer containing tetrafluoroethylene monomer units along with perfluoroalkyl monomer units such as perfluorovinyl ether.

The silicone liquids which are stabilized according to the practice of the present invention are represented by the following illustrative formula:

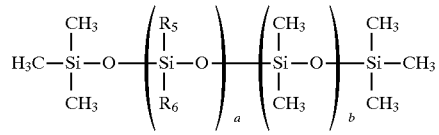

where $R_5$ and $R_6$ are selected from the group consisting of phenyl unsubstituted and substituted alkyl radicals having 1 to 6 carbon atoms, said substituted alkyl radicals being selected from the group of fluoro substituted, amino substituted and mercapto substituted and a is 0 to 1000, b is 1 to 1000 and $50 \leq a+b \leq 1000$. Typical specific materials include: polydimethylsiloxane fluids (e.g., Dow Corning 200 fluid; all viscosities, e.g., 100 cs, 500 cs, 1000 cs, 13000 cs available from Dow Corning Co., Midland, Mich.); dimethyldiphenyl siloxane copolymer (PS 060.5 from Huls America Inc. Piscataway, N.J.); polydimethyl (48%–52%) methylphenylsiloxane (PS063 from Huls America Inc. Piscataway, N.J.); and polymethyl 3,3,3 trifluoropropylsiloxane (PS181, PS182, PS183 from Huls America Inc. Piscataway, N.J.). The silicone liquid has a viscosity ranging for example from about 50 to about 13,000 centistokes, preferably from about 200 to about 10,000 centistokes. In addition, the silicone liquid has a molecular weight ranging for example from about 3,600 to about 80,000, preferably from about 5,000 to about 60,000.

The silicone liquid may also have one, two, three, or more functional end groups such as that disclosed in for example Shoji et al., U.S. Pat. No. 5,157,445 and Swift et al., U.S. Pat. No. 4,146,659, the disclosures of which are hereby totally incorporated herein by reference. Examples of functional silicone liquids include predominantly monoamino functional oil release agents represented by the formula:

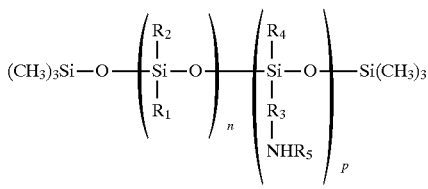

where $50 \leq n \leq 200$, p is 1 to 5 and $R_1$, $R_2$ and $R_3$ are selected from the group consisting of alkyl and arylalkyl radicals having 1 to 18 carbon atoms, $R_4$ is selected from the group consisting of alkyl and arylalkyl radicals having 1 to 18 carbon atoms and a polyorganosiloxane chain having 1 to 100 organosiloxy repeat units, and $R_5$ is selected from the group consisting of hydrogen, alkyl and arylalkyl radicals having 1 to 18 carbon atoms, wherein at least 85% and preferably about 93% of the polyorgano amino functional siloxane chains have p equal to 1 and the

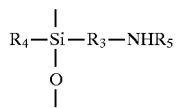

groups are situated at random along the chain, the silicone liquid having predominantly monoamino active molecules to interact with the hydrofluoroelastomer fuser member surface to provide an interfacial barrier layer to said toner and a low surface energy film to release said toner from said surface. If the amino group reacts only with the toner, an interfacial barrier layer is also formed which is at least in part carried off with the copy sheet. The amino functional oil may react with the hydrofluoroelastomer fuser member surface or the toner by similar reactions, the primary reaction being an addition reaction across a double bond. In the ideal case in the above formula p would equal 1 but as a practical matter it is difficult to limit all chains to a p of 1 and therefore the small range of p ranging from 1 to 5 is specified. By the term predominantly monoamino functional oil we mean that greater than 85% and preferably about 93% of the functional oil molecules have one and only one amino group on the silicone oil molecule, hence less than 15% of the active silicone oil molecules have more than one amino group covalently bonded to them.

The thermal stabilizer according to the present invention is the reaction product of a ruthenium compound with a polyorganosiloxane such as a cyclic or linear polyorganosiloxane, or a mixture thereof. Preferably, the polyorganosiloxane is a vinyl polyorganosiloxane such as a cyclic vinyl polyorganosiloxane or linear vinyl polyorganosiloxane, or a mixture thereof. The ruthenium compound may be a hydroxide, an oxide, a salt, a hydrate, and a complex of ruthenium including the following illustrative examples: $RuCl_3$, $Ru(OH)_3$, $RuO_2$, $RuO_4$, $RuCl_2(C_8H_{12})_n$, $H_nRu_4(CO)_{12}$, $RuO_4(py)_2$ (where py is pyridine), $Ru(acac)_3$ (where acac is acetylacetone). In the above ruthenium compounds, n is about 3 or 4. Preferably, the ruthenium compound is ruthenium trichloride hydrate of the formula $RuCl_3.xH_2O$, where x may be from 2 to 5. The salt $RuCl_3$ is available in nonhydrate form, where the $RuCl_3$ in either the hydrate form or the nonhydrate form is hygroscopic. The cyclic and linear polyorganosiloxanes may be used to form the reaction product separately or as a mixture thereof in an amount to provide at least about 5 parts per million of the ruthenium element in the silicone liquid.

It is believed that a rhodium compound, a palladium compound, an osmium compound, or an iridium compound, or mixtures thereof, may be used in place of or in addition to the ruthenium compound during the preparation of the thermal stabilizer. The platinum metal compounds may be an oxide, a hydroxide, a hydrate, a salt, and a complex of a platinum metal including the following examples: $MO_2$, $M_2O_3$, $MO$, $M(OH)_6^{2-}$, $M(OH)_4$, $M(OH)_3$, palladium hydroxide, $MCl_3.H_2O$, $M_2O_3.xH_2O$, $MCl_3.xH_2O$, $MCl_2.H_2O$, $MO_4$, $MI_3$, $M(NO_3)_3$, $MCl_2$, $M(acac)_3$, and $M(acac)_2$. In the above examples, M can be osmium, iridium, rhodium, and palladium; acac is acetylacetone; and x can be from 1 to 3. Thermal stabilizer compositions containing the platinum metals described herein, i.e., Os, Ru, Ir, Rh, and Pd, may be prepared by procedures similar to those described herein and by those described in Heeks, U.S. Pat. No. 5,493,376, the disclosure of which is totally incorporated herein by reference. The benefits of the thermal stabilizer composition prepared from a ruthenium compound is described herein. In addition, it is believed that a thermal stabilizer composition prepared from a ruthenium compound, a rhodium compound, a palladium compound, an osmium compound, or an iridium compound, or mixtures thereof, may work as well as or in certain situations better than a thermal stabilizer composition prepared from a platinum compound with perhaps one or more of the following advantages over the thermal stabilizer prepared from the platinum compound disclosed in Heeks, U.S. Pat. No. 5,493,376: maintain viscosity of the silicone liquid for a longer time; little or no change in the color of the silicone liquid due to the presence of the thermal stabilizer composition; and lesser quantity-needed for stabilization of the silicone liquid.

The cyclic polyorganosiloxanes have the formula:

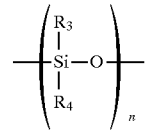

where $R_3$ is an alkyl radical having 1 to 6 carbon atoms and $R_4$ is selected from the group consisting of alkene and alkyne radicals having 2 to 8 carbon atoms and n is from 3 to 6. Typical cyclic polyorganosiloxanes include alkenylcyclosiloxanes such as: $(CH_2=CH(CH_3)SiO)_3$, 1,3,5-triethenyltrimethylcyclotrisiloxane; $(CH_2=CH(CH_3)SiO)_4$, 1,3,5,7-tetraethenyltetramethylcyclotetrasiloxane; $(CH_2=CHCH_2(CH_3)SiO)_4$, 1,3,5,7-tetraallyltetramethylcyclotetrasiloxane; $(CH_2=CH(CH_3)SiO)_6$, 1,3,5,7,9,11-hexaethenylhexamethylcyclohexasiloxane. Typical commercially available cyclic polyorganosiloxanes include the platinum cyclovinylmethylsiloxane complex available from Huls America Inc., Piscataway, N.J. under the designation PC085.

The linear polyorganosiloxanes are selected from those having the formula:

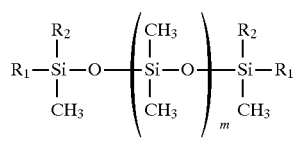

where $R_1$ and $R_2$ are selected from the group consisting of hydroxy, amino, and alkyl alkoxy, alkene and alkyne radicals having 1 to 10 carbon atoms provided at least one of $R_1$ and $R_2$ is alkene or alkyne and m is from 0 to 50. Typical linear polyorganosiloxanes include materials such as: $(CH_2=CH)(CH_3)_2SiOSi(CH_3)_2(CH=CH_2)$, 1,3-Divinyltetramethyldisiloxane; $(CH_2=CHCH_2)_2(CH_3)SiOSi(CH_3)(CH_2CH=CH_2)_2$, 1,1,3,3-Tetraally-1,3-dimethyldisiloxane; $(CH_2=CH)(CH_3)(HO)SiOSi(OH)(CH_3)(CH=CH_2)$, 1,3-Divinyl-1,3-dimethyl-1,3-dihydroxy disiloxane; $(CH_2=CH)(CH_3)_2SiO-(SiO(CH_3)_2)_n-Si(CH_3)_2(CH=CH_2)$, Polydimethylsiloxane, vinyldimethyl terminated where n varies from 1 to 50.

Another type of polyorganosiloxane that can be used is a vinyl siloxane Q resin available from Huls America Inc. as PS496.

The reaction product of the cyclic polyorganosiloxanes and linear polyorganosiloxanes with the ruthenium compound may be formed for example by dissolving ruthenium trichloride hydrate in a suitable solvent and adding the solution to the unsaturated siloxanes for the complexing step as described in Example 1 below. The amount of the ruthenium containing reaction product that is added to the siloxane is dependent on the desired stabilization. Typically, between about 5 and about 15 ppm, preferably about 8 to about 11 ppm, of the ruthenium element are added with no color or a very slight straw coloration to the silicone liquid.

The composition of the ruthenium containing reaction product is not entirely clear. It is likely that it exists, at least in part, as some type of coordination complex compound. In the reaction product, reduced elemental ruthenium possibly may be present.

A silicone liquid containing the present thermal stabiizer composition will exhibit less volatility and a more stable viscosity than the same silicone liquid without the present thermal stabilizer composition. In addition, the instant thermal stabilizer composition may reduce the generation of trifluoropropionaldehyde from trifluoropropyl silicone oil at elevated temperatures.

While the invention has been described with reference to a fusing system in an electrostatographic printing apparatus it will be understood that it has applications in other applications wherein silicone liquids are used at elevated temperatures such as in heating baths, transmission oils and transmission fluids where a viscosity increase can be a detriment.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated. Room or ambient temperature refers to a temperature at about 25° C.

EXAMPLE 1

The thermally stabilized silicone liquid composition was prepared as follows. The silicone liquid was a nonfunctional polydimethylsiloxane oil (herein referred to as "PDMS"), Xerox Silicone Fuser Oil or Dow Corning PDMS Oils, having a viscosity of about 89 centistokes ("cs") at time zero and at room temperature, i.e., about 25° C., (initial viscosity was measured at ambient temperature). A thermal stabilizer composition was prepared from the following ingredients:

(1) Ruthenium chloride hydrate, FW 207.2, Aldrich #20 622.9 ;

(2) 1,3,5,7 Tetravinyltetramethylcyclotetrasiloxane, Huls #T2160;

(3) Polyvinylmethylsiloxane, Huls #PS925; and (4) 1-Butanol, VWR Scientific JT9054-1.

A solution of the complex was prepared by using the following procedure.

(1) The vinyl solution was prepared by mixing 50.0 grams of the 1,3,5,7 Tetravinyltetramethylcyclotetrasiloxane, with 50.0 grams of the linear polyvinylmethylsiloxane.

(2) The ruthenium chloride solution was prepared by dissolving 0.284 grams of the ruthenium chloride hydrate, in 10.1 grams of the 1-Butanol.

(3) The complex reaction product was prepared by gently pouring the ruthenium chloride solution into the vinyl solution. The complex solution contained a maximum of about 0.0012 grams of ruthenium per gram of solution, and was stored in an amber bottle, preferably under refrigeration. The technique for adding the complex reaction product to the siloxane was to add three grams of the complex reaction product to three hundred grams of the test PDMS, to obtain about 11 ppm ruthenium.

The control sample was the same nonfunctional polydimethylsiloxane oil, but without the thermal stabilizer composition.

The cumulative percent weight loss and the viscosity of the thermally stabilized PDMS and of the nonstabilized PDMS samples were determined. The following procedure was used to determine volatility:

(1) a 100–150 ml borosilicate glass beaker and an amount of oil were each weighed on an analytical balance;

(2) the beaker of oil was placed in flow through oven at 400° F. and periodically removed for re-weighing; and (3) the difference in weight was divided by the original weight of the oil and multiplied by 100 to determine the % total weight loss.

The following procedure was used to determine viscosity:

(1) an amount of oil sufficient for measurement on the Brookfield LVT viscometer was placed in a (typically) 400 ml borosilicate glass beaker;

(2) the beaker of oil was placed in flow through oven at 400° F. and periodically removed for viscosity measurement; and (3) the viscosity was measured at room temperature using the appropriate rpm and spindle on the viscometer.

Figure 2:
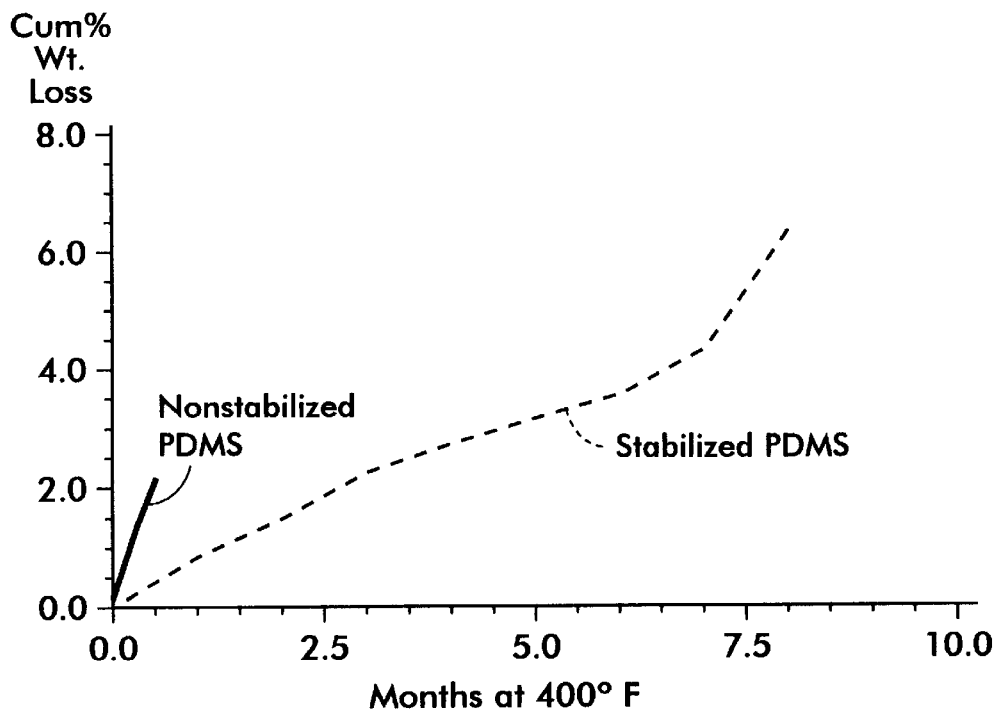
FIG. 2 is a graphical representation of the cumulative weight loss over time at 400° F. for stabilized and nonstabilized polydimethylsiloxane.
Figure 3:
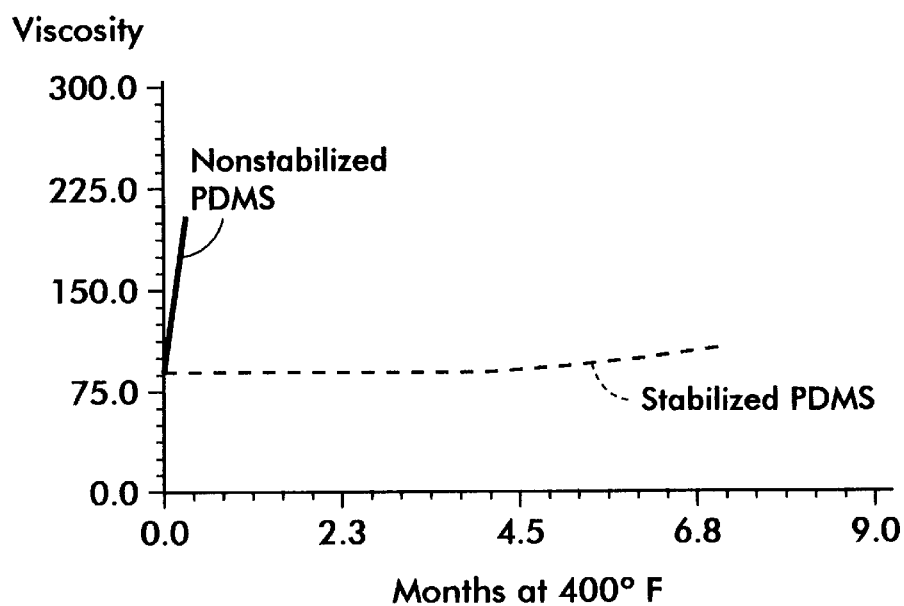
FIG. 3 is a graphical representation of the viscosity in centistokes over time at 400° F. for stabilized and nonstabilized polydimethylsiloxane.

The results are depicted in FIGS. 2–3 and the following Table 1:

TABLE 1

Stabilized and Nonstabilized PDMS Oil Properties After Heating For Various Times

| Months at 400° F. | Volatility of Nonstabilized PDMS (cum. % wt. loss) | Volatility of Ruthenium stabilized PDMS at 11 ppm (cum. % wt. loss) | Viscosity of Nonstabilized PDMS (viscosity 89 cs at time zero) | Viscosity of Ruthenium Stabilized PDMS at 11 ppm (viscosity 89 cs at time zero) |
|---|---|---|---|---|
| 0.25 | 1.36 | | 203 | 89 |
| 0.5 | 2.15 Gelation | | Gelation | 89 |
| 1 | | 0.87 | | 90 |
| 2 | | 1.5 | | 89 |
| 3 | | 2.29 | | 90 |
| 4 | | 2.78 | | 89 |
| 5 | | 3.21 | | 94 |
| 6 | | 3.62 | | 100 |
| 7 | | 4.37 | | 109 |
| 8 | | 6.43 Gelation | | Gelation |

The experimental results indicated that the thermally stabilized PDMS exhibited less volatility and a more stable viscosity than the nonstabilized PDMS. The stabilized PDMS resisted gelation for a much longer time period.

Other modifications of the present invention may occur to those skilled in the art based upon a reading of the present disclosure and these modifications are intended to be included within the scope of the present invention.

We claim:

1. A thermally stabilized silicone liquid composition comprising:

(a) a silicone liquid; and
   (b) a thermal stabilizer composition including a reaction product from at least a ruthenium compound and a polyorganosiloxane.

2. The composition of claim 1, wherein the ruthenium compound is selected from the group consisting of a ruthenium hydroxide, a ruthenium oxide, a ruthenium salt and a ruthenium complex.

3. The composition of claim 1, wherein the ruthenium compound is ruthenium trichloride hydrate.

4. The composition of claim 1, wherein the polyorganosiloxane is selected from the group consisting of a cyclic polyorganosiloxane, a linear polyorganosiloxane, and a mixture of the cyclic polyorganosiloxane and the linear polyorganosiloxane.

5. The composition of claim 4, wherein the cyclic polyorganosiloxane is

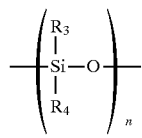

where $R_3$ is an alkyl radical having 1 to 6 carbon atoms and $R_4$ is selected from the group consisting of alkene and alkyne radicals having 2 to 8 carbon atoms and n is from 3 to 6; and the linear polyorganosiloxane is $$R_1-\underset{\underset{CH_3}{|}}{\overset{\overset{R_2}{|}}{Si}}-O-\left(\underset{\underset{CH_3}{|}}{\overset{\overset{CH_3}{|}}{Si}}-O\right)_m-\underset{\underset{CH_3}{|}}{\overset{\overset{R_2}{|}}{Si}}-R_1$$

where $R_1$ and $R_2$ are selected from the group consisting of hydroxy, amino, and alkyl, alkoxy, alkene and alkyne radicals having 1 to 10 carbon atoms provided at least one of $R_1$ and $R_2$ is alkene or alkyne and m is from 0 to 50.

6. The composition of claim 1, wherein the thermal stabiizer composition is present in an amount to provide at least about 5 parts per million of the ruthenium element in the silicone liquid.

7. The composition of claim 1, wherein the silicone liquid is polydimethylsiloxane.

8. The composition of claim 1, wherein the silicone liquid has a viscosity ranging from about 50 centistokes to about 13,000 centistokes.

9. The composition of claim 1, wherein the silicone liquid has a molecular weight ranging from about 3,600 to about 80,000.

10. The composition of claim 1, wherein the ruthenium compound is ruthenium trichloride hydrate and the polyorganosiloxane is 1,3,5,7 tetraethenyltetramethylcyclotetrasiloxane.

11. A fusing system for an electrostatographic printing machine comprising:

(a) a heated fuser member;
   (b) a pressure member forming a fusing nip with the fuser member;
   (c) a supply of release agent; and
   (d) a release agent delivery apparatus to deliver the release agent to the surface of the fuser member, wherein the release agent comprises a silicone liquid and a thermal stabilizer composition including a reaction product from at least a ruthenium compound and a polyorganosiloxane.

12. The fusing system of claim 11, wherein the ruthenium compound is ruthenium trichloride hydrate.

13. The fusing system of claim 11, wherein the polyorganosiloxane is selected from the group consisting of a cyclic polyorganosiloxane, a linear polyorganosiloxane, and a mixture of the cyclic polyorganosiloxane and the linear polyorganosiloxane.

14. The fusing system of claim 13, wherein the cyclic polyorganosiloxane is

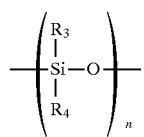

where $R_3$ is an alkyl radical having 1 to 6 carbon atoms and $R_4$ is selected from the group consisting of alkene and alkyne radicals having 2 to 8 carbon atoms and n is from 3 to 6; and the linear polyorganosiloxane is

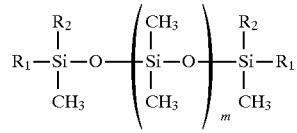

where $R_1$ and $R_2$ are selected from the group consisting of hydroxy and alkyl, alkoxy, alkene and alkyne radicals having 1 to 10 carbon atoms provided at least one of $R_1$ and $R_2$ is alkene or alkyne and m is from 0 to 50.

15. The fusing system of claim 13, wherein the thermal stabilizer composition is present in an amount to provide at least about 5 parts per million of the ruthenium element in the silicone liquid.

16. A thermally stabilized silicone liquid composition comprising:

(a) a silicone liquid; and (b) a thermal stabilizer composition including a reaction product from at least a polyorganosiloxane and a platinum metal compound excluding platinum.

* * * * *